Figure 1:
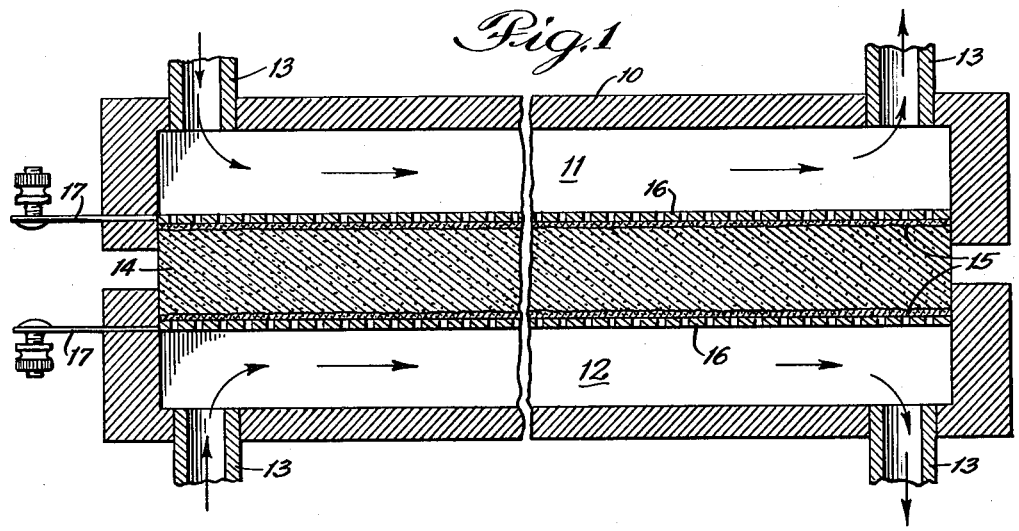

June 21, 1966  E. B. SHULTZ, JR., ET AL  3,257,239
METHOD OF MAKING COMBINED FUEL CELL ELECTROLYTE AND ELECTRODES
Filed March 5, 1962

INVENTORS:
Eugene B. Shultz Jr.,
Leonard G. Marianowski
and Henry R. Linden,

BY Bair, Freeman & Molinare
ATTORNEYS.

United States Patent Office 3,257,239
Patented June 21, 1966

3,257,239
METHOD OF MAKING COMBINED FUEL CELL ELECTROLYTE AND ELECTRODES
Eugene B. Shultz, Jr., Chicago, Ill., Leonard G. Marianowski, Hammond, Ind., and Henry R. Linden, Hinsdale, Ill., assignors to Institute of Gas Technology, a corporation of Illinois
Filed Mar. 5, 1962, Ser. No. 177,222
5 Claims. (Cl. 136—86)

This invention relates to a fuel cell and method of making the same and more particularly to the construction of a semisolid electrolyte having film electrodes thereon.

Fuel cells have heretofore been constructed using solid or liquid electrolytes with various types of electrodes in association therewith, but are all subject to defects of one kind or another. A solid electrolyte on which the electrodes have been painted has been attempted. While painted electrodes are desirable because of ease of application and because they use very little of the noble metals of which the electrodes are formed, cells of this type have not been entirely satisfactory because of the low conductivity of the solid electrolyte.

A classic problem in connection with fuel cells has been the accomplishment of three-phase contact between the gaseous solid and liquid materials. Porous electrodes have commonly been used to permit diffusion of gases from one side and liquid electrolyte from the other side to internal surfaces where the three-phase contact occurs. It is, however, extremely difficult to maintain the various hydrostatic, viscous and surfaces forces in equilibrium within the electrodes so that there is a tendency either for flooding in which the liquid electrolyte is forced through the electrode or gassing in which the gases pass through the elctrode into the electrolyte.

It has also been attempted to utilize the porous sintered matrices impregnated with liquid electrolyte in which the electrolyte is held in the pores of the matrix by surface tension. Flooding is avoided in cells of this sort, but in practice it has proven to be impossible completely to impregnate the matrix with liquid electrolyte. Unfilled passsages therefore remain to permit gaseous fuel and oxidant to diffuse between the anode and cathode and burn non-electrochemically. Also, the use of the matrices reduces the apparent conductivity of the liquid electrolyte so that it possesses little advantage, if any, over solid electrolytes.

Use of platinum and silver painted electrodes applied to solid electrolytes, such as stabilized zirconia, is a standard laboratory technique in the study of conductivity of solids. However, the application of painted electrodes to semisolid electrolytes which are in the plastic state at service temperatures has not heretofore been attempted. This technique was conceived and studied by us to gain the cost advantage of an easily applied thin metal film electrode, particularly important with expensive noble metals, combined with the high conductivity and intimate electrode-electrolyte contacting that are possible with semisolid electrolytes. Solid electrolytes have characteristically low conductivities; completely liquid electrolytes create practical problems in maintaining intimate contact. One novelty of our invention, therefore, is the fortunate combination of film electrodes and semisolid electrolytes which has important advantages over prior combinations of film electrodes with electrolytes other than semisolids, or semisolid electrolytes with other electrodes. It was unexpected that attainment of steady-state operation would be as rapid, and stability in service as good as was found. Semisolid electrolyte compositions were discovered that had high conductivities approaching those of liquid electrolytes. These compositions were completely immobilized, although they contained molten carbonates, and would support the continuous, thin electrode films without permitting them to be dispersed into the body of the electrolyte.

It is accordingly an object of the present invention to provide a fuel cell in which the electrolyte comprises a semisolid mixture of carbonates of the alkali or alkaline earth metals and a finely powdered refractory material, such mixture being in the plastic state at cell operating temperatures above the melting point of the carbonate mixture, but stiff enough to retain its shape in plate form at these temperatures.

According to a feature of the invention, the mixture of carbonates and powdered refractory material is pressed into a flat disc or plate whose surfaces are sprayed with fine metal particles or painted with metallic paint formed of metallic particles suspended in an organic liquid medium. The coatings are heated to a temperature sufficient to drive off the organic liquid and provide a porous skeletal film of metal over the surfaces of the disc and in intimate contact with the electrolyte.

Figure 2:
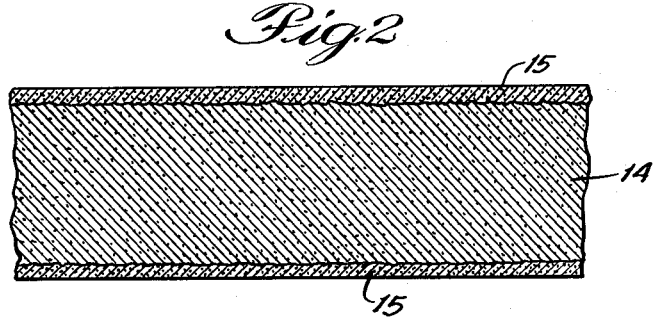

The above and other objects and features of the invention will be more readily apparent from the following description when read in connection with the accompanying drawing, in which:

FIG. 1 is a sectional view more or less diagrammatic of a fuel cell embodying the invention; and FIG. 2 is an enlarged partial section of the electrolyte with the electrode coatings applied thereto.

The fuel cell, as diagrammatically illustrated in FIG. 1, may be of any conventional construction comprising a casing 10 supporting an assembly of electrolyte, electrodes and current collectors dividing the casing into two chambers 11 and 12. Connections 13 are provided at the ends of the chambers to circulate a fuel gas through one of the chambers and an oxygen bearing gas through the other chamber.

The center assembly comprises a semisolid electrolyte 14, according to the invention, having porous electrodes 15 on its opposite surfaces and in initimate contact with the electrolyte. The electrolyte and electrode assembly is sandwiched between collector plates 16 which are of porous metal construction in the form of punched metal plates, expanded metal, sintered metal plates, or the like. The collector plates must be sufficiently porous to pass the gases into contact with the electrodes and must be of electronically conductive material, but otherwise they may be constructed in any desired manner. The collector plates are connected respectively to terminals 17 extending through the housing and to which lead wires may be connected.

According to the present invention, the electrolyte is formed of a mixture of carbonate of the alkali or alkaline earth metals, such as sodium, lithium, calcium, potassium, rubidium or cesium carbonate mixed with a finely powdered refractory material. The refractory material may be formed of any well known refractory which is inert to the carbonates, such as magnesium oxide, aluminum oxide, zirconium oxide, or the like. Silica is not suitable for this purpose since it tends to react with the carbonates.

The electrodes 15 may be formed of metals or mixtures or alloys of metals which are inert to the gases present and which have a catalytic activity. Metals suitable for use as the cathode are those metals which are electron donors and generally include copper, silver or gold. Metals suitable for use as the anode are those metals which are electron acceptors including iron, cobalt, nickel, platinum, palladium, rhodium, osmium or iridium.

The electrolyte is preferably prepared by intimately mixing the finely powdered refractory material and the carbonate or mixture of carbonates in quantities generally on the order of thirty to seventy parts carbonates to seventy to thirty parts refractory. The mixture is then pressed into a flat disc of the desired configuration, is fired, and is then cooled and then ground to provide flat parallel surfaces with the desired disc thickness.

We have found that when the particles of refractory material are relatively regular and uniform approximately spherical particles, it is necessary to employ a binder in the dry mixture to hold it together until the mixture has been fired. One such binder which has proved to be extremely satisfactory is a polyvinyl alcohol which has excellent binding and adhesive characteristics. In using this material, the polyvinyl alcohol is mixed with water in proportions of about 5% by weight polyvinyl alcohol and 95% by weight of water, although these values are not critical. This mixture is then sprayed over the dry mixture of carbonate particles and refractory particles until the same are sufficiently wetted to adhere when pressed together. Approximately 2% by weight of the solution is added to the mixture of refractory and carbonates. During the subsequent firing or baking operation, the water and polyvinyl alcohol are driven off and the carbonates in the dry mixture are raised to a temperature above their melting point so that they will adhere and tie together the entire mixture. In addition to polyvinyl alcohol, other binders such as paraffin or ceresin wax dissolved in an organic solvent may be used.

We have further found that where the refractory is reduced to relatively fine fibrous or elongated particles, the mixture of carbonates and refractory can be pressed into a plate or disc without the use of a binder. This is believed to be due entirely to the shape of the refractory particles such that when pressed together with the carbonates they will tend to felt with each other and to hold the dry mixture in the form of a self-supporting plate or disc.

The electrodes are preferably applied by painting on opposite surfaces of the disc so formed a paint formed of fine particles of the desired metal or metals mixed with an organic liquid. Bonding agents, such as organic resins, may also be included. After painting the surfaces of the electrolyte, the painted coatings are baked to a temperature sufficiently high to drive off the organic matter. Then in fuel cell service, the coatings are raised to temperatures near or exceeding the sintering temperatures of the metals. This will leave the metal particles in the form of thin skeletal coatings on opposite faces of the disc to serve as the electrodes. In the case of metals with sintering temperatures higher than cell operating temperatures, these may be mixed in the form of a paint with a paint made with a metal of lower sintering temperature. In service, the one metal will sinter and hold the unsintered metal particles. In any case, the thin skeletal electrodes are extremely thin and fragile and are not self-supporting.

In operation, the cell operating temperature is above the melting point of the carbonates employed so that they will function substantially as a liquid electrolyte. However, due to their mixing with the powdered refractory, the carbonates will be retained in plate form as a semisolid mass. It has been found that even at temperatures above the melting point of the carbonates employed, the disc is sufficiently self-sustaining to support the thin, metallic electrodes.

Furthermore, the electrodes maintain an intimate contact with the electrolyte and the electrolyte itself is highly conductive to ions. The cell of the present invention functions, therefore, with the efficiency of a liquid electrolyte cell and with the structural advantages of a solid electrolyte cell. The electrodes are sufficiently porous to pass fuel gases, air, and combustion products.

EXAMPLE I

In one specific example, a cell was formed by preparing a binary eutectic of sodium and lithium carbonates having a melting point near 500° C. The carbonates were melted together and the product was ground to a fineness to pass a 200 mesh screen. The ground carbonate was mixed 30 parts by weight of carbonate to 70 parts by weight of minus 325 mesh, high purity magnesia refractory grain. This mixture after being thoroughly milled together was pressed into a flat disc three inches in diameter at a pressure of 8500 p.s.i. and was fired in a carbon dioxide containing atmosphere to 600 to 700° C., cooled and ground to a thickness of 120 mils.

The finished disc was painted on one side to form an anode with one coat of platinum paint containing 65% by weight of colloidal platinum, 3% by weight base metal and the remainder turpentine. The painted surface was immediately dried under a heat lamp which raised its temperature to about 120° C. to drive off the turpentine. Loading of the anode was 10 mg. of dried paint per square cm.

The other or cathode side of the disc was painted with a silver paint containing 70% by weight silver suspended in xylol. Three coats of this paint were applied with a brush and each coat was immediately dried under the heat lamp. The final loading was 8.8 mg. of dried paint per square cm.

The painted and dried disc was then sandwiched between metal current collecting grids, as shown at 16, and the assembly was housed in a housing, such as shown at 10. A fuel gas formed of methane converted by way of catalytic steam reforming and water gas shift to a stream containing 70 to 75% by volume of hydrogen, 20 to 25% by volume of carbon dioxide and 5 to 10% by volume of carbon monoxide was then passed through the housing over the platinum painted surface. An oxidant gas in the form of an oxygen plus carbon dioxide stream with $O_2/CO_2$ molar ratio of 0.5 was passed over the silver coated face of the disc. The cell was elevated to an operating temperature of 600° C. and was operated continuously for 58 hours at a load of 25 ma./sq. cm., and a terminal voltage of 0.65 to 0.69 volt. Stable operation was maintained throughout this period with no appreciable decline in performance after the first five to ten hours and the test was terminated voluntarily.

EXAMPLE II

In another specific example, a cell was formed following the same procedure as that outlined in the first example, but using a ternary eutectic of sodium, lithium and potassium carbonates having a melting point of about 397° C. In this procedure the carbonates were ground to a fineness to pass a 100 mesh screen and 30 parts by weight of the mixed carbonates were mixed by 70 parts by weight of minus 300 mesh high purity magnesia refractory. The remaining procedures were the same as in Example I and the results were comparable to those achieved in Example I.

While one embodiment of the invention has been shown and described herein, it will be understood that it is illustrative only and not to be taken as a definition of the scope of the invention, reference being had for this purpose to the appended claims.

What is claimed is:

1. The method of making fuel cells which comprises mixing finely powdered carbonates of at least one of the alkali or alkaline earth metals having a melting point below the normal cell operating temperature with a finely powdered refractory, pressing the mixture into a flat plate, painting the faces of the plate with suspensions of metal powders in an organic liquid medium, heating the paint to a temperature sufficient to remove the organic liquids but insufficient to sinter the metal powder, and raising the temperature of the plate, in fuel cell service, to near or above the sintering temperature of said metal powder, whereby the metal powder forms a thin skeletal coating on the faces of said plate.

2. Method of claim 1 wherein the temperature at which said paint is heated to drive off organic matter is about 120° C.

3. The method of making fuel cells which comprises mixing finely powdered carbonates of at least one of the alkali or alkaline earth metals having a melting point below the normal cell operating temperature with a finely powdered refractory, pressing the mixture into a flat plate, coating one face of the plate with a finely divided metal selected from Group 1B in an organic liquid medium and the other face with a finely divided metal selected from Group 8 in an organic liquid medium, heating the coatings to a sufficiently high temperature to remove the organic liquids, and raising the temperature of the plate, in fuel cell service, to near or above the sintering temperature of said finely divided metal whereby said metal forms a thin skeletal coating on the faces of said plate.

4. The method of making a fuel cell which comprises mixing together powdered carbonates of at least one of the alkali or alkaline earth metals and powdered refractory of a size to pass a 325 mesh screen, pressing the mixture into a flat disc, heating the disc to a temperature above the melting point of the carbonates, coating the faces of the disc with films of finely divided metals in liquid vehicles, heating the films to remove the vehicles, and raising the temperature of the disc, in fuel cell service, to near or above the sintering temperature of said metal powder, whereby the metal powder forms a thin skeletal coating on the faces of said disc.

5. The method of claim 4 in which the carbonates comprise about 30% of the mixture, and the refractory about 70%.

References Cited by the Examiner

UNITED STATES PATENTS

| | | | |
|---|---|---|---|
| 2,708,683 | 5/1955 | Eisen | 136—120 |
| 2,738,375 | 3/1956 | Schlotter | 136—28 |
| 2,969,315 | 1/1961 | Bacon | 136—86 X |
| 2,980,749 | 4/1961 | Broers | 136—86 |
| 3,120,456 | 2/1964 | Broers | 136—86 |
| 3,147,149 | 9/1964 | Postal | 136—86 |

FOREIGN PATENTS

| | | |
|---|---|---|
| 806,592 | 12/1958 | Great Britain. |
| 850,706 | 10/1960 | Great Britain. |

WINSTON A. DOUGLAS, *Primary Examiner.*

JOHN R. SPECK, *Examiner.*

H. FEELEY, A. B. CURTIS, *Assistant Examiners.*